July 22, 1969  O. L. AKERVOLD ET AL  3,457,543
TRANSDUCER FOR PRODUCING TWO COAXIAL BEAM
PATTERNS OF DIFFERENT FREQUENCIES
Filed Feb. 26, 1968

INVENTORS.
ORRILL L. AKERVOLD
WILLIAM J. KUTNY, JR.
BY
Bruce C Lutz
ATTORNEY

United States Patent Office
3,457,543
Patented July 22, 1969

3,457,543
TRANSDUCER FOR PRODUCING TWO COAXIAL BEAM PATTERNS OF DIFFERENT FREQUENCIES
Orrill L. Akervold, Edmonds, and William J. Kutny, Jr., Seattle, Wash., assignors to Honeywell Inc., Minneapolis, Minn., a corporation of Delaware
Filed Feb. 26, 1968, Ser. No. 708,165
Int. Cl. G01v 1/22; H04b 13/02
U.S. Cl. 340—10                               9 Claims

ABSTRACT OF THE DISCLOSURE

A transducer using concentric rings for simultaneously producing two nearly identical coaxial beam patterns of two different frequencies.

---

This invention was conceived under Government funding.

The present invention pertains generally to transmitting and receiving transducers and more specifically to sonar transducers. Even more specifically, the present invention pertains to a sonar transducer which simultaneously produces outputs of two different frequencies wherein the beam patterns of both outputs have similar beamwidth and side lobe characteristics.

While the prior art has shown transducers with a plurality of circular or cylindrical transducing elements, none of these transducers have satisfactorily solved the problem of simultaneously producing two substantially identical, coaxial beam patterns of different frequencies.

As will be explained later, merely using two concentric transducer elements does not solve the problem because the resulting beam patterns will not be identical. The present invention, however, produces simultaneously two coaxial beam patterns of substantially the same characteristics at two different frequencies.

It is therefore an object of this invention to provide a transducer which will simultaneously produce two similar coaxial beam patterns of different frequencies.

Other objects and advantages of this invention will be apparent from a reading of this specification and appended claims in conjunction with the figures wherein:

Figure 1:
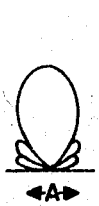
FIGURES 1 and 2 illustrate beam patterns of different size transducer elements.
Figure 2:

FIGURES 1 and 2 illustrate beam patterns of different size transducer elements, FIGURE 2 resulting from a larger element B. The beam patterns of simple transducer elements are determined by the overall size of the transducer relative to the wavelength of sound in the medium in which the sound is radiated and the effective vibration amplitude of the transducer face. As is known to those skilled in the art, the larger element normally, other conditions remaining the same, will produce a narrower or more directive beam pattern.

To help understand the invention to be described, the following discussion of plane faced radiators is presented. Consider a square shaped transducer, as shown in FIGURE 3A, vibrating with uniform amplitude perpendicular (Z direction) to the square face. For any plane perpendicular to the face and parallel to the Y axis, YZ plane for instance, the radiation pattern has a standard width and a first side lobe level of —13.8 db relative to the maximum response which is in the Z direction. If a graph is made (FIGURE 4A) showing the total radiation area (weighted for vibration amplitude), projected onto a line in the plane of the pattern (Y axis in FIGURE 3), plotted against the Y position of that part of the radiating face, a curve 22 as shown in FIGURE 4A would result from the solid-line transducer shown in FIGURE 3A. This curve may be designated a VLC (Vibration Level Curve).

Now if the weighted projected vibration level is changed, either by changing the amplitude of the vibration or simply removing part of the radiating face, the vibration level curve in FIGURE 4A will change and the directivity (or beam) pattern will also change. In fact, it can be shown that the beam pattern is a function only of the vibration level curve and the wavelength.

Figure 4B:
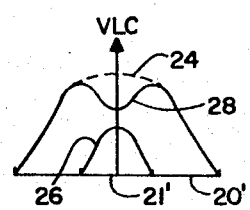
FIGURES 4A and 4B illustrate vibration level curves for the transducer configurations of FIGURES 3A and 3B, respectively.

The VLC for a circular disc is shown by curve 24 in FIGURE 4B. This type of VLC curve for the same overall element size, results in a beam pattern with decreased side lobe levels and an increased beam width over that resulting from a transducer having VLC corresponding to 22.

If the VLC curve is reduced in amplitude in the middle relative to the ends, as indicated for example by curve 23 of FIGURE 4A, the resulting beam pattern has higher side lobes and a smaller beam width than the referenced curve 22.

We will now return to the problem of producing two coaxial similar beam patterns of different frequencies. It is first necessary for the geometrical center of the two transducer frequency sections to coincide.

Figure 3B:
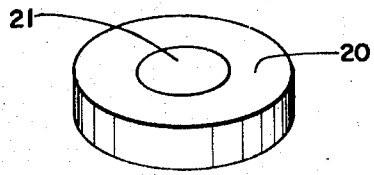
FIGURES 3A and 3B illustrate two transducer element configurations.
Figure 3A:
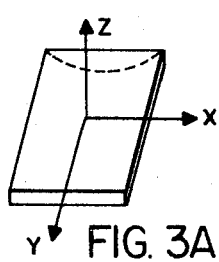
Figure 4A:
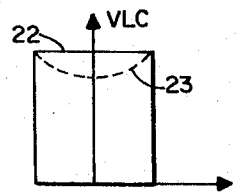

FIGURE 3B illustrates a transducer comprising two cylindrical transducer elements. The outer doughnut-shaped element in this simplified embodiment is designated as 20 while the inner element which is situated in the hole of the doughnut is designated as 22. Since the transducer of FIGURE 3 is for explanation purposes only, no details are shown as to how these trandsucer elements might be connected or mounted.

The configuration shown in FIGURE 3B would produce coaxial patterns but the patterns would not be similar because the VLC of the two sections would be considerably different, as illustrated in FIGURE 4B.

In FIGURE 4B lower portions or bases are shown and are numbered 21' and 20'. They correspond in length to the diameters of the transducer elements shown in FIGURE 3B. Above the bases 20' and 21', are shown three curves. The first curve which is shown partly in dashed and partly in solid lines is designated as 24 and is a simplified representation of amplitude distribution or VLC which would be produced by the transducer of FIGURE 3B if it were one solid piece of material. A smaller curve designated as 26 is the VLC for element 21 alone. The final VLC designated as 28 is the composite VLC which is produced by the element 20 due to the hole therein wherein the transducer 21 is situated.

From the above discussion it will be observed that a VLC of 20 or any other transducer may be obtained by subtracting from the overall VLC, the VLC which is produced by the section of the transducer which has been removed. Thus, VLC 28 is VLC 24 minus VLC 26.

In view of the above it is apparent that the pattern for section 20 would be narrowed and with higher side lobes due to the concentration of its VLC 28 towards the outside, while the pattern of section 21 would be widened and have significantly lower side lobes due to the concentration of its VLC 26 toward the middle.

It is thus the purpose of this invention to circumvent this situation and produce a coaxial configuration of transducer sections operating at different frequencies both of which exhibit the same beam width and reduced side lobes.

This is accomplished by appropriately selecting two sets of nesting transducer rings, alternate rings having different frequencies, such that when the VLC's are plotted the curve for each frequency set is sufficiently concentrated toward the middle of the transducer to produce the desired degree of side lobe reduction.

Before proceeding it must be realized that, as is well known to those skilled in the art, the beam width of the beam pattern resulting from VLC 24 will be dependent upon the width of the transducer expressed in terms of the wavelength as well as the shape of the VLC curve. Two transducers having similarly shaped VLC's with the same base size (compared to a wavelength) will have beam patterns of similar directivity.

Figure 5:
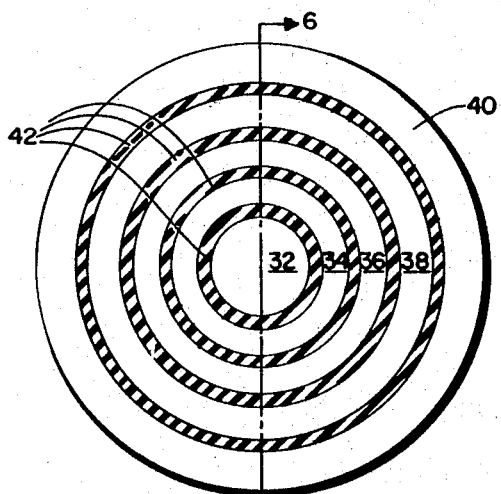
FIGURES 5 and 6 illustrate respectively sectional front and side views of a transducer of the present invention.

In FIGURE 5 a transducer is shown containing four transducer elements. The elements are numbered 32, 34, 36, and 38 starting with the central transducer which is a solid cylinder and working outward from the center which in the other three transducers are cylindrical rings. Outside the cylindrical ring transducer 38, is a part of a mounting or housing means 40. Situated intermediate to the rings 32 and 34 is insulation 42. Similarly, there is insulation 42 between each of the other cylindrical rings and between cylindrical ring 38 and the housing 40.

Figure 6:
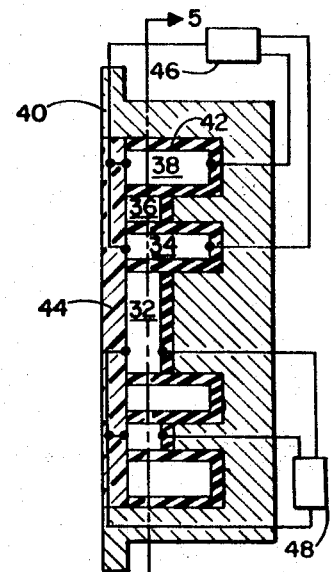

Referring now to FIGURE 6 it will be noticed that the elements already named in conjunction with FIGURE 5 are similarly numbered in FIGURE 6. In addition there is an acoustic window 44 which is situated over the transducer elements 32–38 and through which the sonar signals are easily transmitted. As will be noted, the transducer elements are mounted in the mounting means 40 and that the transducer elements are of different sizes. This is so the individual elements will resonate at the frequency applied thereto and further so that the two beam patterns resulting can be adjusted to coincide with one another in magnitude. A first signal generator 46 has one lead connected to one face or side of transducer elements 38 and 34 and a second lead connected to the other face of the same two transducer elements. The generator 46 thus applies an alternating signal to opposing faces of the transducer elements 34 and 38 so as to produce resonance in these elements and thereby generate a sonar output. Similarly, a generator 48 has one lead connected to one face or side of transducer elements 34 and 36 and another lead connected to the other side or face of the same transducer elements.

In one embodiment of the invention, the transducer elements were made of ferroelectric ceramic while the insulation was made of cork. The acoustic window 44 was made of polyurethane. It is to be understood, of course, that while these specific elements were utilized in making one embodiment, other materials may be equally applicable to other embodiments of the invention.

Figure 7:
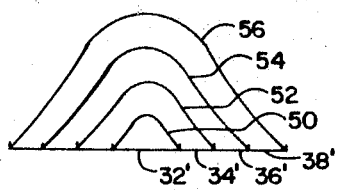

In FIGURE 7, the various transducer discs are indicated by the designations 32', 34', 36' and 38' for convenience at the bottom of the figure. The VLC's these elements would have if they were whole discs rather than doughnuts are shown as waveforms 50, 52, 54, and 56 corresponding to the respective transducer elements in the numerical order named.

Figure 8:

In FIGURE 8, a first VLC 58 is representative of VLC 56 minus VLC 54 and therefore of element 38. A further VLC 60 is indicative of VLC 52 minus VLC 50 and therefore of element 34.

Figure 9:
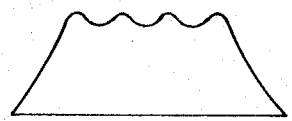

FIGURE 9 is representative of the addition of VLC's 58 and 60.

Figure 10:
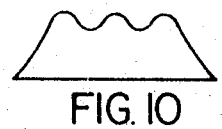
FIGURES 7–10 illustrate simplified vibration level curves of the transducer shown in FIGURES 5 and 6.

FIGURE 10 is a curve representative of VLC's 54 and 50 added together with VLC 52 subtracted therefrom.

As is shown in FIGURE 6 the elements 34 and 38 are of a much longer construction in the direction of the axes of the transducer elements so as to resonate at the proper frequency. While transducer design often utilizes resonance of the elements at the transmitted or receive frequencies, the invention will operate satisfactorily in a non-resonant condition. The voltage applied thereto is then adjusted in amplitude to produce approximately equal directivity pattern amplitudes for the two portions thus making the beam patterns substantially coincide.

As can be seen, the VCL's 28 and 58 are generally unsatisfactory for forming directivity patterns with low side lobes because these VLC's have dips in the middle. However, the VLC's of FIGURES 9 and 10 are relatively flat and do produce satisfactory beam patterns due to the additions of the outputs of two transducers. Of course, more rings could be used than the four shown to produce an even smoother or rounded out beam pattern and thus obtain even more similarity between the two different frequency beam patterns. However, for the purposes of explanation, only four rings are required.

In summary therefore, the invention lies in the use of four or more transducer elements combined so as to be used with different frequencies applied to adjacent concentric transducers and thus produce two similar beam patterns or beam patterns which cover the same desired target area at two different frequencies.

While a specific embodiment has been shown and described, other embodiments will occur to those skilled in the art after a thorough consideration of this invention and we wish to be limited not by the specification and drawings but only the scope of the appended claims wherein we claim:

1. Transducer apparatus for producing two coaxial beam patterns of different frequencies simultaneously comprising, in combination:
   mounting means;
   a first set of concentric electro-mechanical transducer elements;
   a second set of concentric electro-mechanical transducer elements;
   first signal means for providing a first excitation signal of a given frequency connected to said first set of elements to cause the elements of said first set to provide an output at the given frequency;
   second signal means for providing a second excitation signal of a second frequency different from said given frequency connected to said second set of elements to cause the elements of said second set to provide an output at the second frequency; and
   means attaching said first and second sets of elements to said mounting means in an array for producing two coaxial compatible beam patterns of different frequencies which will both include a given target.

2. Apparatus as claimed in claim 1 wherein the elements are cylindrical rings and are attached to said mounting means to be operative in a direction perpendicular to the face of the array.

3. Apparatus as claimed in claim 2 wherein the first and second sets of transducer elements are attached to said mounting means so that adjacent rings operate at different frequencies.

4. Apparatus as claimed in claim 3 wherein the transducer elements comprise a ferroelectric ceramic and wherein each set of concentrically mounted elements coact to produce secondary lobes of substantially the same level.

5. Apparatus as claimed in claim 3 wherein the transducer elements comprise a ferroelectric ceramic and wherein each set of centrically mounted elements coact to produce secondary lobes of substantially lower magnitude than the primary lobe.

6. Apparatus of the class described comprising, in combination:
   a first plurality of transducer elements for operation at a first frequency;
   a second plurality of transducer elements for operation at a second frequency; and
   means for mounting said first and second plurality of transducer elements concentrically, said transducer elements simultaneously producing two beam patterns of different frequencies wherein both beam patterns cover a given target area.

7. Transducer apparatus for producing two coaxial beam patterns of different frequencies simultaneously comprising, in combination:
a first set of spaced apart, concentric transducer elements;
second transducer element means interleaved and concentric with said first set of transducer elements; and
means for simultaneously energizing said transducer elements at different frequencies for producing two different frequency beam patterns which include a given target area.

8. Apparatus as claimed in claim 7 wherein said second transducer element means comprises at least two elements.

9. Apparatus as claimed in claim 8 including means for applying different amplitude energizing signal to each element of said set to achieve optimum beam patterns.

References Cited

UNITED STATES PATENTS

| | | | |
|---|---|---|---|
| 2,427,062 | 9/1947 | Massa | 340—10 |
| 2,451,967 | 10/1948 | Massa | 340—10 |
| 2,732,536 | 1/1956 | Miller | 340—10 X |
| 2,767,387 | 10/1956 | Langevin | 340—10 |
| 2,922,140 | 1/1960 | Levine et al. | 340—10 X |
| 2,956,184 | 10/1960 | Pollack | 340—10 X |
| 3,277,451 | 10/1966 | Parssinen | 340—10 X |

RODNEY D. BENNETT, Jr., Primary Examiner
BRIAN L. RIBANDO, Assistant Examiner